Aug. 29, 1967 W. R. BARRY 3,338,416
ROTATING SELF-CLEANING STRAINER
Filed Sept. 17, 1964 3 Sheets-Sheet 1

FIG. I

INVENTOR.
WILLIAM R. BARRY
BY
*Charles C. Allyn*
ATTORNEY

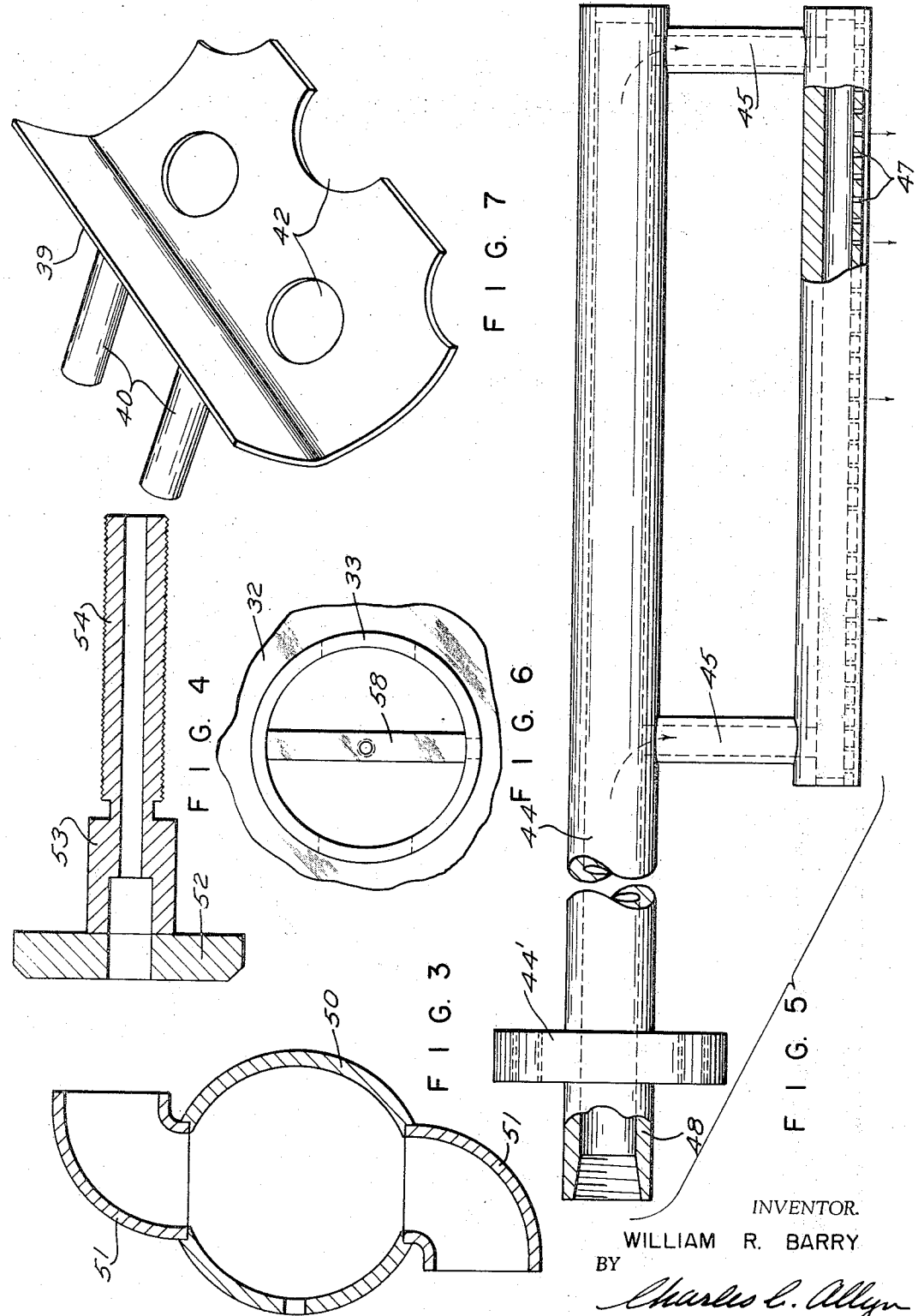

3,338,416
ROTATING SELF-CLEANING STRAINER
William R. Barry, San Fernando, Calif. (% Fluid Mechanics, Inc., 13830 Saticoy St., Van Nuys, Calif. 91402)
Filed Sept. 17, 1964, Ser. No. 405,321
(Filed under Rule 47(b) and 35 U.S.C. 118)
5 Claims. (Cl. 210—297)

This invention relates to a rotating liquid filter or strainer, and more particularly to self-cleaning backwash means for removing dirt from a revolving cylindrical strainer.

The present self-cleaning filter or strainer may be used to clean river water for industrial use, to remove slag from the cooling water used in steel mills, to clean the water used upon grinding machines. It may also be used to clean water or other liquids where a continuous supply of the filtered or strained liquid is desired.

The apparatus of the present invention features a housing having a horizontally elongated chamber, which has supported therein a skeleton drum for rotation about a horizontal longitudinally extending axis offset toward a first interior side wall of the housing. The drum is adapted to carry a porous filter medium on its cylindrical surface. A filtrate outlet in the housing communicates with the drum interior. An inlet is positioned in the housing above the surface of said drum, arranged to direct fluid to be filtered into said chamber against the drum surface at a location adjacent the first interior side wall. A vertical baffle extends longitudinally within the chamber between the drum and the second interior side wall of said housing, the baffle having a longitudinally extending opening therein opposite the surface of the drum at the level of the drum axis. The baffle also has a depending portion extending at an angle beneath the drum to the first interior side wall and is provided with holes for the passage of particles which settle out of the incoming fluid. The baffle defines with said second wall and the bottom wall of the housing a first sump to receive particles separated from the fluid, and a second sump is located beneath the bottom of the housing, the bottom wall of said housing being provided with openings for the passage of particles to said second sump. Each of the sumps has an outlet for the removal of particles collected therein. A backwash device is mounted within the drum and has discharge jet openings located opposite and directed toward the longitudinally extending opening in said baffle for cleaning the filter medium and for directing particles into the opening.

Preferably the housing is cylindrical and the axis of the drum extends generally in the same direction as that of the housing. Further according to the invention the filtrate outlet is fixedly connected at one end thereof to one end of the drum for rotation therewith and its other end is provided with at least one reaction opening spaced from the drum axis and transverse thereto so that the discharge of fluid through the opening will impart a driving force to rotate the drum. Likewise, there is preferably included valve means for controlling the flow rate to the reaction opening thereby in turn permitting control of the driving force tending to rotate the drum.

The above and other features of the invention will be further understood from the following description when read in conjunction with the accompanying drawings, wherein:

FIG. 3 is a vertical sectional view through jet elbow driving means for rotating the skeleton drum;

FIG. 4 is a longitudinal sectional view through valve means for regulating the flow of liquid to the drum-driving means of FIG. 3;

FIG. 5 is a side elevation with parts in section of jet cleaning means that is supported in a rigid position inside of the rotating skeleton drum;

FIG. 6 is an end view of a liquid discharge sleeve and of a spider carried by such sleeve to drive speed indicating means, and FIG. 7 is a perspective view of baffle means to be described.

Figure 1:
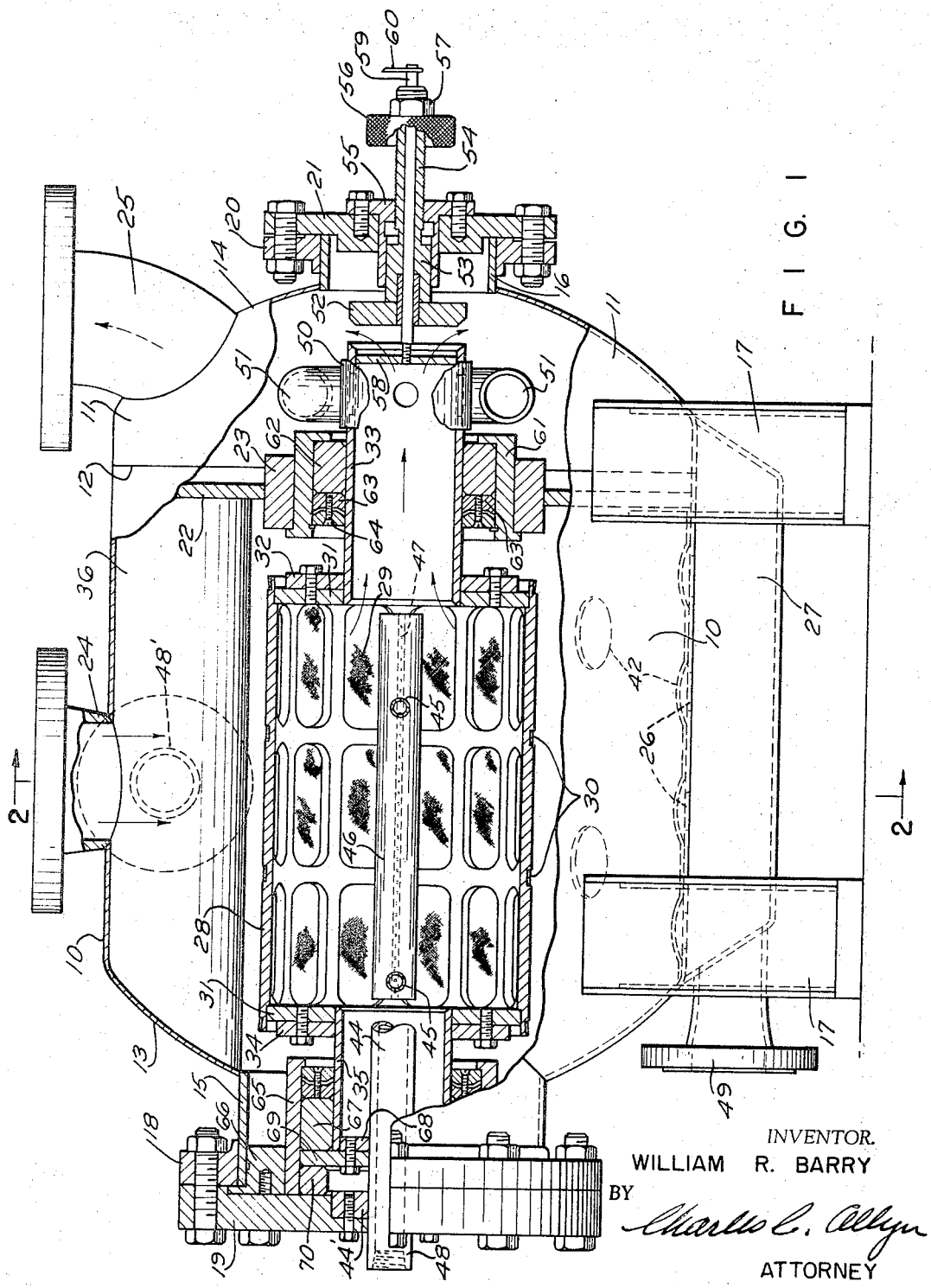
FIG. 1 is a vertical longitudinal sectional view through the self-cleaning strainer of the present invention with parts shown in side elevation.

Referring to the drawings, FIG. 1 shows a cylindrical housing in which the rotating drum and other operating parts to be described are mounted. This housing comprises a major shell portion 10 and a minor shell portion 11 which are welded one to the other along the seam 12. The shell portion 10 has the outwardly bulging head 13 and the shell portion 11 has the similar outwardly bulging head 14. The head 13 has a large opening and extending from such opening is the circular sleeve 15 which is welded to the head portion 13. The opposite head 14 has a smaller opening and a sleeve 16 welded to such head. The cylindrical housing so far described is supported in a horizontal position by a frame having the downwardly extending legs 17. The sleeve 15 has welded thereto the ring member 18 forming an annular flange to which the closure head 19 is removably secured by the bolts shown. The opposite sleeve 16 has welded thereto the encircling ring 20 which forms a flange to which the removable head 21 is secured by the bolts shown.

Within the cylindrical housing 10–11 near the seam 12 a partition or bulkhead 22 is provided which divides the housing into a major portion which receives the water or other liquid to be filtered, and a smaller portion which receives this liquid after it has been filtered by the means to be described. The bulkhead 22 has an opening formed therethrough and inserted in this opening and welded to the partition is the bearing supporting ring 23. The liquid to be filtered enters through the short flange pipe 24 disposed at the upper side of the housing, and the liquid after it has been filtered leaves through the short curved outlet pipe 25 extending upwardly from the outwardly bulging head 14. The lower horizontal wall of the cylindrical housing 10–11 is provided with several holes 26 through which the dirt or contaminant that settles out of the liquid can pass into the trough-shaped sump 27 welded to the lower curved wall of the housing, and disposed between the supporting legs 17.

Within the cylindrical housing 10–11 is rotatably supported a basket or drum 28. This drum has the form of a cylinder of skeleton construction, as will be apparent from FIG. 1, and is adapted to have secured to its outer face a sheet of filtering material such as a filter screen or woven filter fabric 29. This filter material is secured about the skeleton drum by several annular clamping bands 30. The skeleton drum has disposed within the same adjacent each end an annular flange member 31 which is welded to such drum. To the flange member 31 at the right-hand end of the skeleton drum of FIG. 1 is secured by the bolts shown the flange member 32 having a central opening adapted to receive the relatively long liquid discharge sleeve or tube 33 which is welded within a central opening in the flange 32. Surrounding this sleeve 33 are drum supporting bearing means hereinafter described which rotatably support one end of the skeleton drum. At the opposite or left-hand end of the skeleton drum is secured to the flange 31 a flange member 34 having a central opening adapted to receive the relatively long sleeve 35 which is welded to the flange member 34, and surrounding this sleeve are supporting bearings hereinafter described.

Figure 2:
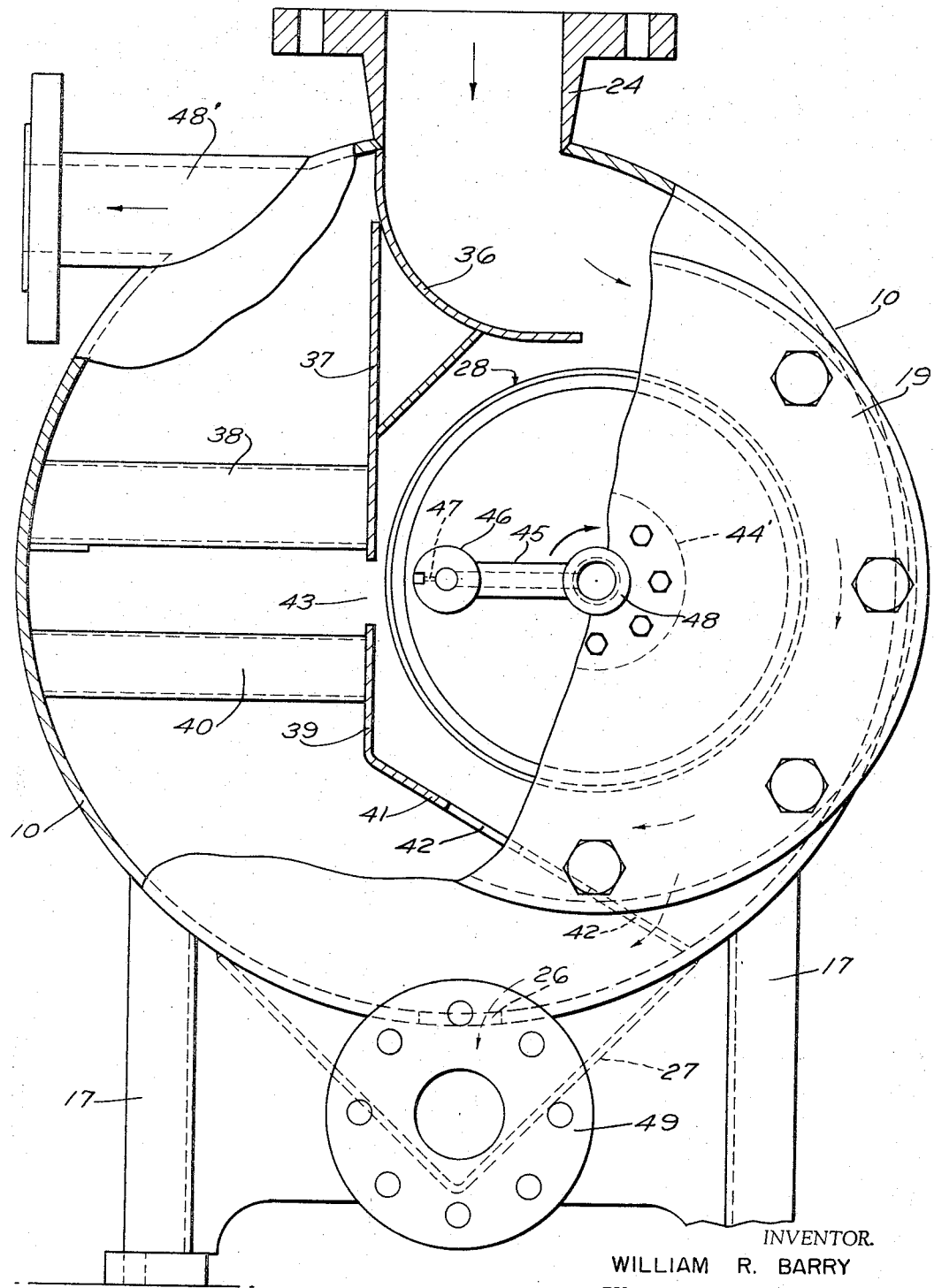
FIG. 2 is a vertical sectional view taken approximately on line 2—2 of FIG. 1, with parts shown in end view.

It is important to note that the skeleton drum just described is supported to rotate about a longitudinally extending axis that is disposed off-center from the central axis of the housing 10–11, as is apparent from FIG. 2. This arrangement serves to position the rotating drum relatively close to the curved, downwardly extending side wall of the cylinder housing so that as the liquid to be filtered enters through the inlet pipe 24, it will be directed by a curved wall 36 supported in the housing to pass downwardly about the skeleton drum and inwardly through the screen or filter fabric 29 covering the same, as indicated by the arrows in FIG. 2. The heavier dirt which moves downwardly within the housing under the influence of gravity will enter the holes 26 above mentioned and accumulate in the trough-shaped sump 27 disposed at the underside of the cylindrical housing.

Supported within the cylindrical housing is a vertically disposed partition or baffle 37 which is supported by the legs 38 to extend downwardly from the upper portion of the curved wall 36 to a position slightly above the horizontal axis about which the skeleton drum rotates. Disposed somewhat below the lower end of the baffle 37, so as to provide a horizontal passage therebetween, is the vertically disposed baffle 39 that is supported by the legs 40. This baffle 39 has the downwardly inclined portion 41 which has a number of holes 42 formed therethrough, as will be apparent from FIG. 7. These holes 42 permit the dirt which moves downwardly by gravity to reach the sump 27 above mentioned. The baffles 37 and 39 are so supported that they provide a slotlike opening 43 extending lengthwise of the housing in line with the horizontal axis of rotation of the skeleton drum.

One important feature of the present invention resides in fixed backwash means supported within the drum in a rigid position therein near the filter screen or fabric so that jets of liquid will be forced outwardly through the rotating screen to wash the dirt that has accumulated on the outer surface of such screen through the adjacent opening 43 directly into the sump disposed to the left of the partitions 37 and 39, as will be apparent from FIG. 2.

This fixed backwash means as best shown in FIG. 5 comprises a relatively long pipe 44 which is clamped to and supported by the large drum head 19 disposed at the left-hand end of the housing as shown in FIG. 1. This pipe 44 which is supported by its integral annular flange 44' projects centrally within the rotating skeleton drum 28 and extends throughout substantially the entire length thereof. The pipe 44 is closed at one end and has extending laterally therefrom the short pipe lengths 45, the outer ends of which are secured to the longitudinally extending pipe 46 which has the numerous discharge jet openings 47, as will be apparent from FIGS. 1, 2 and 5. The pipe 44 has the internally threaded end portion 48.

The clean water or other liquid is discharged into the outlet end portion 11 of the housing. This portion of the housing has leading therefrom a pipe, not shown, which is connected to a power-operated pump, also not shown. The discharge side of this pump is connected to the inlet end 48 of the backwash pipe shown in FIGS. 1, 2 and 5. The pump just mentioned supplies clean water or other liquid to the jets 47 to be discharged therefrom horizontally and outwardly through the screen or fabric covering the rotating drum to pass through the long opening 43 into the relatively quiet sump area disposed at the left-hand side of the baffles 37 and 39 which are best shown in FIG. 2. The dirt that accumulates in this area or second sump can be removed from time to time through a discharge outlet pipe 48' which is provided with a discharge valve, not shown. The heavier dirt which accumulates in the lower sump 27 can be discharged therefrom from time to time through a valve, not shown, but bolted to the flanged pipe portion 49 extending laterally from the lower sump 27. If either flushing valve is opened, the pressure of the water or other liquid entering through the inlet 24 will serve to flush out either the lower sump or upper sump. The lower sump for the heavy contaminants and the upper sump for the lighter contaminants communicate with each other.

Another important feature of the present invention resides in simple means for rotating the skeleton drum in the direction indicated by the arrow in FIG. 2 at various different speeds as the circumstances may require. This rotating means utilizes the movement of the cleaned liquid which is flowing through the rotating sleeve 33 in the direction indicated by the arrow in FIG. 1. Such rotating means has the construction best shown in FIG. 3 and comprises a central ring portion 50 of a size to fit snugly around the long sleeve 33 and is bolted or otherwise rigidly secured thereto. The ring portion or sleeve 50 has extending outwardly therefrom the elbow-shaped discharge nozzles 51 which are disposed 180° apart. The arrangement is such that the reaction of the liquid being discharged through these elbow nozzles will rotate the skeleton drum that is covered by the filter screen or fabric 29 to advance said screen past the fixed spraying nozzles 47.

The speed at which such skeleton drum will be rotated is readily controlled by providing a valve member 52 which is supported in a non-rotating position by its shouldered portion 53, for adjustment in an axial direction. The stem portion 54 is threaded so that it may be adjustably supported by a regulator sleeve 55 having an annular flange that is bolted to the end plate 21. This sleeve is internally threaded to receive the threads of the stem 54. The arrangement is such that the stem can be rotated in the sleeve 55 to adjust the valve member 52 toward or from the valve seat at the end of the rotating sleeve 33. The stem 54 has mounted thereon the internally threaded knurled sleeve 56 which is secured in a locked position on such stem by the locking nuts 57. The gasket or packing that surrounds the valve member 53–54 will prevent this valve means from being accidentally rotated, but will permit it to be manually rotated by the knurled sleeve 56 to adjust the valve 52 towards or from its seat.

At the outer end of the rotating sleeve 33 is provided the transversely extending bridge bar 58 which is welded to the inner wall of such sleeve. A rotating indicator rod 59 which extends through the bore of the valve member 53–54 is rigidly secured to the bridge bar 58 to rotate with the rotating drum 28. At the outer end of the rod 59 is provided a speed indicating needle 60 that indicates the speed at which the drum 28 is rotating.

The rotating filter drum 28 is, as above stated, supported at its right-hand end of FIG. 1 by a long sleeve 33, and at its left-hand end by the shorter sleeve 35. This drum is rotatably supported at its right hand by the bearing sleeve 61 that fits snugly and non-rotatably in the fixed ring 23. The bearing sleeve 61 has snugly and non-rotatably mounted therein the bronze bearing ring 62 in which the long sleeve 33 rotates. At the inner face of the ring 62 is provided a seal assembly such as a pair of rings 63 on either side of a rubber flat strip seal, with screws 64 for securing the parts of the seal assembly together. This seal will keep dirty water from the bearings and from the clean side of the flow.

The opposite or left-hand end of the drum 28 is rotatably supported by a long sleeve 65 having rigidly secured thereto the surrounding ring 66. This ring 66 fits in the bore of the end tube 15. A bearing ring 67 is fitted snugly and non-rotatably in the sleeve 65. The rotating sleeve 35 has rigidly mounted in its bore the ring 68 to which is bolted the disc-like ring 69. The outer marginal portion of the ring 69 rotates between a side face of the bearing ring 67 and a ring thrust bearing 70 that abuts against the large end plate 19. Liquid seals are also provided at this end within the sleeve 65.

The arrangement is such that the rotating drum 28 can be removed from the left-hand end of the housing 10–11 when the end plate 19 is removed, and the hydraulic means for rotating such drum is removed from the sleeve 33.

It will be seen from the foregoing that the liquid-straining device of the present invention is self-cleaning in that as the drum covered with the strainer sheet is rotated at the selected speed, numerous jets of the clean liquid will be directed outwardly through such sheet to wash the contaminants therefrom through the slot 43 and into the large sump disposed at one side of the rotating drum. When dirt accumulates in this sump or in the lower sump 27, it can be removed from either from time to time without stopping the filtering operation. This is done by simply opening the discharge valve, not shown, for the lower sump 27 or for the pipe 48 leading from the side sump.

The revolving drum 28 is rotated at the desired speed by the clean liquid discharged from the right-hand end of the sleeve 33, and the speed of such rotation may be varied as desired by changing the position of the valve 52. Speeds ranging from 10 to 30 r.p.m. are contemplated, and the flow through this self-cleaning strainer may be anywhere from about 150 to 10,000 g.p.m. depending upon the size of the device. The device is capable of removing all contaminants over about .002 in diameter and continues to do so day in and day out without stopping.

The flow of the water or other liquid to be cleaned through the apparatus shown is as indicated by the arrows. Such liquid under pressure enters the housing 10–11 through the flanged pipe 24 and leaves through the curved pipe 25. The entering liquid passes inwardly through the screen or cloth covering the rotating drum 28 and then moves axially in this drum to pass from the long sleeve 33 into the clean liquid chamber 11 and then to the outlet 25.

Having thus described the invention, what is claimed and desired to be protected by Letters Patent is:

1. Apparatus for continuously separating particles from a flowing fluid, comprising
   a housing providing a horizontally elongated chamber,
   a skeleton drum supported in said chamber for rotation about a horizontal longitudinally extending axis offset toward a first interior side wall of said housing,
   said drum being adapted to carry a porous filter medium on its cylindrical surface,
   said housing having an inlet located above the surface of said drum and arranged to direct fluid to be filtered into said chamber against the drum surface at a location adjacent said first wall,
   a filtrate outlet in said housing in communication with the drum interior,
   a vertical longitudinally extending baffle within said chamber between said drum and a second interior side wall of said housing,
   said baffle having a longitudinally extending opening therein opposite the surface of the drum at the level of the drum axis,
   said baffle further having a depending portion extending at an angle beneath the drum to said first wall and provided with holes for the passage of particles which settle out of the incoming fluid,
   a backwash device mounted within said drum and having discharge jet openings located opposite and directed toward said longitudinally extending opening in said baffle,
   said baffle defining with said second wall and the bottom wall of the housing a first sump to receive particles separated from the fluid,
   a second sump beneath the bottom of the housing, the bottom wall of said housing being provided with openings for the passage of particles to said second sump, and
   each said sump having an outlet for the removal of particles collected therein.

2. The apparatus claimed in claim 1 in which said housing is cylindrical and the axes of said housing and said drum extend in generally the same direction.

3. The apparatus claimed in claim 1 in which said filtrate outlet is fixedly connected at one end thereof to one end of said drum for rotation therewith and the other end of said filtrate outlet has at least one reaction opening spaced from said drum axis and transverse thereto so that discharge of fluid from said reaction opening creates a driving force to rotate said drum.

4. The apparatus claimed in claim 3 in which control valve means are provided in said filtrate outlet for controlling flow rate through said reaction opening and hence the driving force.

5. The apparatus claimed in claim 4 in which said housing is cylindrical and the axes of said housing and said drum extend in generally the same direction.

References Cited

UNITED STATES PATENTS

| | | | |
|---|---|---|---|
| 842,602 | 1/1907 | Wurdack | 210—402 X |
| 1,012,974 | 12/1911 | Bird | 210—393 |
| 1,554,943 | 9/1925 | Antoine | 210—391 X |
| 1,882,178 | 10/1932 | Cumberland | 210—402 |
| 2,081,668 | 5/1937 | Horton | 55—404 X |
| 2,351,712 | 6/1944 | Sattele et al. | 210—391 X |
| 2,530,916 | 11/1950 | Stratton | 210—354 |
| 3,116,990 | 1/1964 | Duer | 55—404 X |
| 3,131,145 | 4/1964 | Rosaen | 210—411 X |

SAMIH N. ZAHARNA, *Primary Examiner.*

C. DITLOW, *Assistant Examiner.*